June 30, 1970     J. P. FRASER     3,517,546

DETECTOR CONFIGURATION FOR THE ULTRASONIC LEAK DETECTOR

Filed May 6, 1968

INVENTOR:
J. P. FRASER
BY:

*Theodore E. Beiser*

HIS ATTORNEY 3,517,546
DETECTOR CONFIGURATION FOR THE ULTRASONIC LEAK DETECTOR
John P. Fraser, Houston, Tex., assignor to Shell Oil Company, New York, N.Y., a corporation of Delaware
Filed May 6, 1968, Ser. No. 726,895
Int. Cl. G01m 3/24
U.S. Cl. 73—40.5                                    4 Claims

ABSTRACT OF THE DISCLOSURE

A system for detecting leaks in buried pipelines wherein an instrument is transported through the pipeline. The system utilizes an ultrasonic detection system having two hydrophones or pick-ups, one being positioned ahead and one behind the instrument. The two hydrophones are connected to a coincidence or differential circuit that indicates the unbalance between the two hydrophone signals.

RELATED APPLICATIONS

The present invention is an improvement over the leak-detecting system disclosed in a copending application, Ser. No. 602,628, filed Dec. 19, 1966, entitled "Apparatus and Process for Detecting and Locating Leaks in Pipelines," now Pat. No. 3,409,897 and assigned to the same assignee as the above invention.

BACKGROUND OF THE INVENTION

The above copending application discloses a system for detecting leaks in buried pipelines wherein a housing containing the detecting system is transported through the pipeline by the fluid flow. The housing is normally referred to as a pig or a scraper and is provided with a plurality of flexible pistons or scraper cups whose outer periphery seals against the inner wall of the pipeline in order that the fluid flow may propel the housing through the pipeline. The detecting system of the copending application is of the ultrasonic type wherein a hydrophone or pick-up means is used to detect the sonic waves resulting from the various sounds generated in the pipeline. It is well known that when a leak occurs in a pipeline the escaping fluid generates sound waves or pressure waves in the fluid in the pipeline. The system of the copending application operates in the ultrasonic range to discriminate against travel noise or sound waves that are generated as the instrument is transported through the pipeline. More particularly, the instrument is designed to operate above the 20,000 cycle per second frequency range to effectively discriminate against the low frequency sounds. This is possible since the escaping fluid generates a sound wave or pressure pulse having a broad frequency spectrum that extends into the ultrasonic range. An additional feature of the copending invention is that it is designed to operate so as to exclude or ignore sounds in the range above 50,000 cycles per second. Sounds of such high frequency may occasionally exist in a pipeline, but are not normally related to leaks and should be discriminated against.

While the system disclosed in the prior patent application has been successfully operated, at times it fails to operate due to excessive travel noise in the pipeline. While, as pointed out, the escaping fluid generates ultrasonic vibrations, they are of relatively low amplitude and can be obscured by the travel noise in the pipeline.

In an attempt to overcome the above difficulty, the device shown in the prior application has been modified to use rubber-covered wheels to support the instrument as it moves through the pipeline in place of the original cup-shaped pistons. While this improved the response of the system, it was still susceptible to the travel noise which at times masked the noise from known leaks. Furthermore, replacement of the original cup-shaped pistons by rubber-covered wheels has resulted in serious lowering of the driving force available to move the instrument through the pipeline. In addition, certain geometrical configurations in a pipeline are difficult to pass over with wheels, such as certain gate valve bodies, certain pipeline T fittings, etc.

SUMMARY OF THE INVENTION

The present invention solves the above problems by providing two hydrophones or pick-up units on the instrument pig. One of the hydrophones is located in front of the pig and the other at the back of the pig. Since the travel noise generated by the pig passing through the pipeline has substantially the same level at the front and the rear of the pig, it will produce substantially the same signal level in both pickups. In contrast, the noise produced by the fluid escaping through a leak will be detected first by the hydrophone at the forward end of the pig and then later by the hydrophone at the rear of the pig.

The hydrophones in the above system are connected to a circuit that will detect the difference in the signal level between the signals produced by the two hydrophones. In addition, the circuit is provided with a means for adjusting the output of the amplifier circuits coupled to one of the hydrophones so that in the absence of a leak it will balance the output of the amplifier coupled to the other hydrophone. The balancing circuit can be an automatic gain control circuit having a very long time constant. The time constant should exceed the time that the sound produced by a leak can be detected by the system. For example, it is normally possible to detect the leak-produced sounds for approximately four seconds. Thus, the automatic gain control should rebalance the two amplifiers for a period longer than this, preferably considerably longer, as for example, 40 seconds. Further, the circuit is provided with a time delay means such that no signal is recorded unless its duration is greater than 0.2 second. The purpose of this time delay is to insure that incidental noises produced by passage of the scraper cups over welds or other obstructions will not be recorded. While the above time intervals are generally acceptable, they will vary depending on the rate of fluid flow and design of the instrument.

BRIEF DESCRIPTION OF THE DRAWINGS

The present invention will be more easily understood from the following detailed description when taken in conjunction with the attached drawings in which.

DESCRIPTION OF PREFERRED EMBODIMENT

Figure 1:
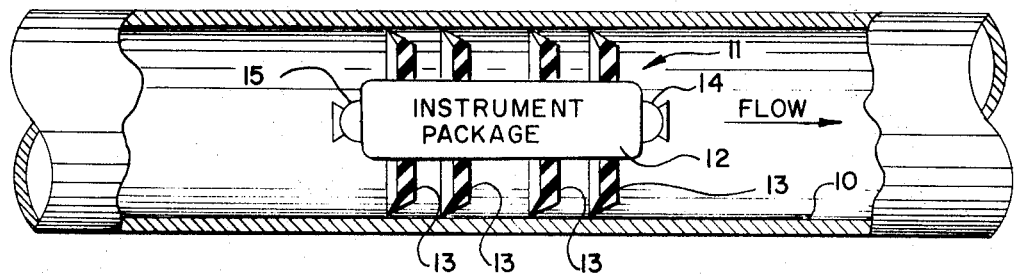
FIG. 1 is an elevation view of a pipeline showing an instrument pig disposed therein.

Referring now to the drawings, there is shown in FIG. 1 a section of a buried pipeline having an instrument pig disposed therein. More particularly, there is shown a pipeline 10 having an instrument pig 11 disposed therein with the pig being transported through the pipeline in the direction indicated by the flow arrow, by the flow of fluid through the pipeline. The pig comprises housing 12 having a plurality of cup-shaped flexible pistons or scraper cups 13 disposed thereon. The scraper cups are formed of a resilient material, for example, rubber or other plastic in order that they may be deformed as the pig passes obstructions in the interior of the pipeline. The scraper cups have an overall diameter substantially the same as the interior diameter of the pipeline and thus the fluid flowing in the pipeline will transport the pig at approximately the same rate as the fluid flow. The instrument package is provided with a hydrophone or pick-up 14 at its forward end and a similar hydrophone or pick-up 15 at its rear. The hydrophones can be conventional hydrophones used in seismic surveys or other transducers capable of converting sound waves to related electrical signals. For example, piezoelectric or magnetostrictive transducers, such as those used in acoustical logging devices could be used.

The position of the pig in the pipeline can be determined by reference to the fluid flow or other devices can be used determined by reference to the fluid flow or other devices can be used to mark its exact position at known intervals. Likewise, the pig may be provided with means for generating its own power from the fluid flow in the pipeline and means for regulating its speed of travel through the pipeline.

Figure 2:
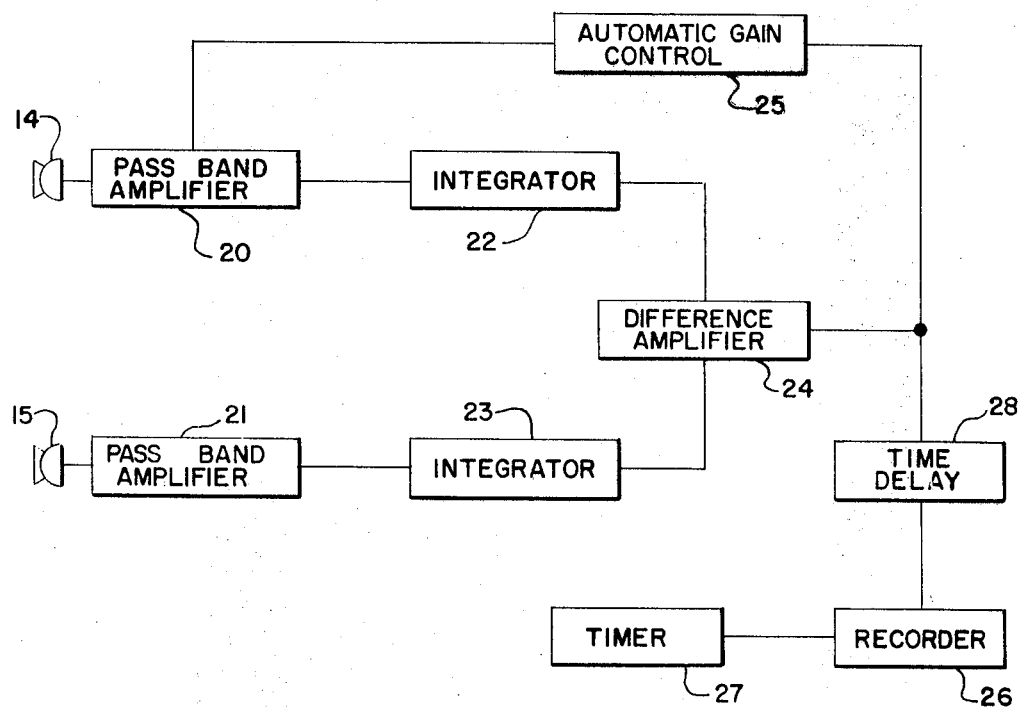
FIG. 2 is a block diagram of a circuit suitable for use in carrying out the present invention.

Referring now to FIG. 2 there is shown in block diagram form a circuit suitable for carrying out the present invention. More particularly, each of the hydrophones 14 and 15 is coupled to a band pass amplifier 20 and 21. The amplifiers are designed to pass only the frequencies above 30,000 Hz. and substantially reject frequencies below this level. Of course, in place of the band pass amplifiers one could use conventional broad band amplifiers and suitable filtering circuits. The amplifiers are coupled to integrating circuits 22 and 23 that are designed to integrate the signal passed by the amplifier so that sudden, random, short-duration noise pulses will not be recorded. The outputs of the two integrating circiuts are coupled to a differential amplifier 24 that is designed to supply an output signal equal to the algebraic difference between the two input signals. The differential amplifier 24 is coupled to both the recording circuit 26 and an automatic gain control 25. As explained above, the automatic gain control should have a relatively long time constant, for example, 10 times the time interval over which the leak can be detected. As set forth above, if a leak can be detected for approximately 4 seconds, the time constant of the gain control circuit should be approximately 40 seconds. The use of the gain control circuit will permit a slow readjustment of the amplifier 20 to balance the signal from the amplifier 21 in case the travel noise generated at the front of the pig varies from the travel noise generated at the rear of the pig. The recorder 26 can be either a conventional magnetic tape recorder or punched paper tape recorder. In either case, it is preferable that the recorder be driven by a timer means 27 in order that the record can be correlated with the position of the pig in the pipeline. This can readily be done since the pig will travel at substantially the flow rate of the fluid and knowing the time at which the signal of interest is recorded, one can determine the approximate location at the time the event was recorded. A time delay circuit 28 is provided so that only signals of duration longer than approximately 0.2 second will be recorded. In this fashion, noises produced by passage of the scraper cups over obstructions within the pipeline such as well protrusions will not be recorded.

While the power supply for the above circuits has not been shown, it can be supplied from batteries or by generators driven by the flow of fluid through the pipeline. Also, it may be possible to eliminate the need for electrical means for driving the recorder in the case of punched paper tape, which may alternatively be driven by a spring-wound motor, although it is preferable to use a timer in order that the events recorded on the tape may be readily correlated with the position of the pig in the pipeline.

The present leak-detecting system is operated in the same manner as the system described in the above-referenced copending application. More particularly, the pig is inserted in the pipeline at a scraper trap or similar injecting means, and is then transported through the pipeline by the fluid flow and removed at a second location in the same manner as used for removing pigs or scrapers from the pipeline. The pig, as it passes through the pipeline, will detect all noises that occur in the pipeline above the set pass band. As explained, the travel noise generated on the front of the pig is substantially equal to that generated behind the pig and thus the travel noises will be cancelled in the detecting circuit. In contrast, high frequency noises that result from the leakage of fluid through a leak in the pipeline will be detected first by the hydrophone at the front of the pig and later by the hydrophone at the rear of the pig. Thus, the noises due to leakages will not be balanced in the detecting circuit and recordable signals will be recorded.

In contrast to the present system, the system in the copending application relies solely on filtering to eliminate travel noise. This is possible if the frequency of the travel noise is low and the high frequency content of the leak-produced noise is high. If either of these conditions are absent, then the prior system produces a poor response. The present invention relies on difference circuits to eliminate travel noise in combination with filtering. Thus, it will operate even when conditions are unfavorable.

I claim as my invention:

1. A system for detecting leaks in a buried pipeline wherein a housing containing the detecting system is conveyed through the pipeline, said system comprising:
   a pair of hydrophone means, one of said hydrophone means being mounted on the housing at one end and the other hydrophone means being mounted on the housing at the opposite end, said hydrophone means detecting the occurrence of pressure waves in said pipeline and converting the detected waves to related electrical signals;
   circuit means, said hydrophones being coupled to said circuit means, said circuit means detecting the difference between the two electrical signals;
   a time delay circuit, said time delay circuit being coupled to the output of said circuit means;
   an automatic gain control circuit, said automatic gain control circuit being coupled between the output and one input of said circuit means whereby the output of signal of said circuit means may be adjusted to near zero in the absence of a leak; and
   a recording means, said time delay circuit being coupled to said recording means to record signals whose duration is greater than 0.2 second.

2. The system of claim 1 wherein said circuit means comprises a difference amplifier.

3. The system of claim 2 and in addition a pass band amplifier and integrating circuit for each hydrophone, said pass band amplifier and integrating circuits being disposed between said hydrophones and said circuit means.

4. The system of claim 2 wherein said automatic gain control has a time constant equal to approximately ten times the time interval during which a leak may be detected.

References Cited

UNITED STATES PATENTS

| | | |
|---|---|---|
| 3,045,116 | 7/1962 | Gant. |
| 3,155,954 | 11/1964 | Larrick et al. _____ 340—261 |
| 3,192,516 | 6/1965 | Simpkins et al. _____ 73—40.5 |
| 3,391,571 | 7/1968 | Johanson _____ 73—1 |
| 3,409,897 | 11/1968 | Bosselaar et al. ____ 73—40.5 XR |
| 3,413,653 | 11/1968 | Wood _____ 73—40.5 |

LOUIS R. PRINCE, Primary Examiner

W. A. HENRY II, Assistant Examiner

U.S. Cl. X.R.

346—33